(12) United States Patent
Fourcand et al.

(10) Patent No.: US 6,778,491 B1
(45) Date of Patent: Aug. 17, 2004

(54) METHOD AND SYSTEM FOR PROVIDING REDUNDANCY FOR SIGNALING LINK MODULES IN A TELECOMMUNICATION SYSTEM

(75) Inventors: Serge F. Fourcand, Fairview, TX (US); Robert S. Gammenthaler, Jr., Frisco, TX (US); Michael J. Hanlon, Dallas, TX (US)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/539,920

(22) Filed: Mar. 31, 2000

(51) Int. Cl.$^7$ .............................. H04L 1/22; H04Q 11/04
(52) U.S. Cl. ........................ 370/217; 370/384; 370/522; 340/3.1; 709/209; 714/2
(58) Field of Search ................................. 370/216, 217, 370/218, 219, 220, 254, 351, 357, 360, 384, 386, 389, 410, 522; 340/825.01, 2.1, 2.25, 2.26, 3.1, 3.43; 709/208, 209, 238, 239; 714/1, 2, 3, 4

(56) References Cited

U.S. PATENT DOCUMENTS

| | | | | |
|---|---|---|---|---|
| 4,730,303 A | * | 3/1988 | Suzuki | 370/58 |
| 5,150,405 A | | 9/1992 | Lee et al. | |
| 5,680,437 A | * | 10/1997 | Segal | 379/15.01 |
| 5,953,314 A | * | 9/1999 | Ganmukhi et al. | 370/220 |
| 5,974,114 A | * | 10/1999 | Blum et al. | 379/9 |
| 6,038,210 A | * | 3/2000 | Kim | 370/216 |
| 6,175,574 B1 | * | 1/2001 | Lewis | 370/522 |
| 6,584,190 B1 | * | 6/2003 | Bressler | 379/230 |

FOREIGN PATENT DOCUMENTS

EP 0 592 153 A2 4/1994

OTHER PUBLICATIONS

Mahamed Atoui, An Integrated Systems Design of The Intelligent Network; Proceedings of the IEEE/ACM International Conference on Developing and Managnig Expert System Programs; Sep. 1991; pp. 187–194.

* cited by examiner

Primary Examiner—Alpus H. Hsu
(74) Attorney, Agent, or Firm—Baker Botts; Craig A. Hoersten; V. Lawrence Sewell

(57) ABSTRACT

In particular embodiments, the present invention provides a system for managing signaling messages in a telecommunication system. The system includes a first control module that is operable to receive signaling messages from a plurality of signaling links, process the signaling messages, and send the processed signaling messages through a communication network interface. The system also includes a second control module that is operable to receive the signaling messages from the plurality of signaling links, process the signaling messages, and send the processed signaling messages through a communication network interface. The system further includes a Matelink coupled to the first control module and the second control module. The Matelink is operable to communicate the status of the first control module to the second control module and the status of the second control module to the first control module. The first control module and the second control module are further operable to be in either an active mode or a standby mode, only one of the first control module and the second control module being in the active mode at one time, the control module in the active mode sending the processed signaling messages through the associated communication network interface and the status messages over the Matelink.

33 Claims, 7 Drawing Sheets

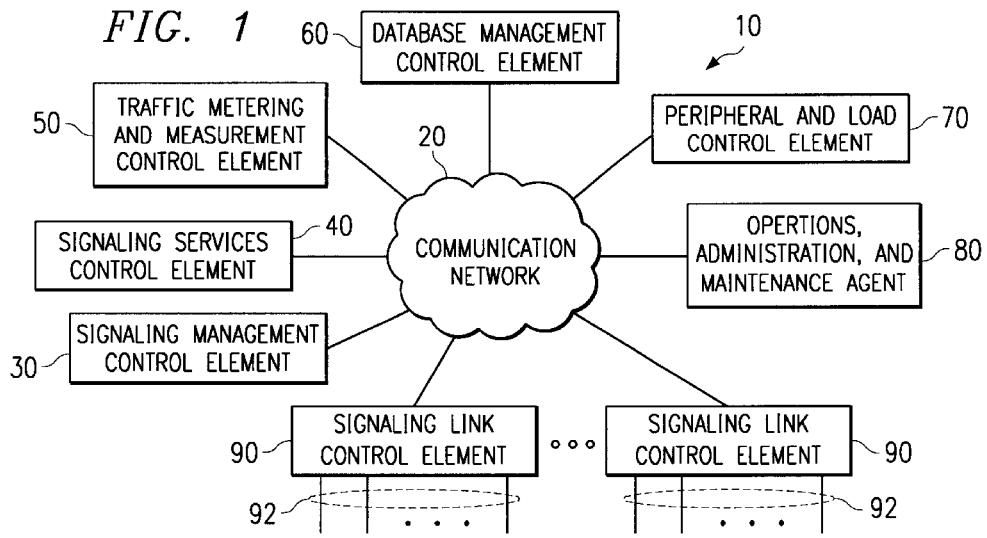
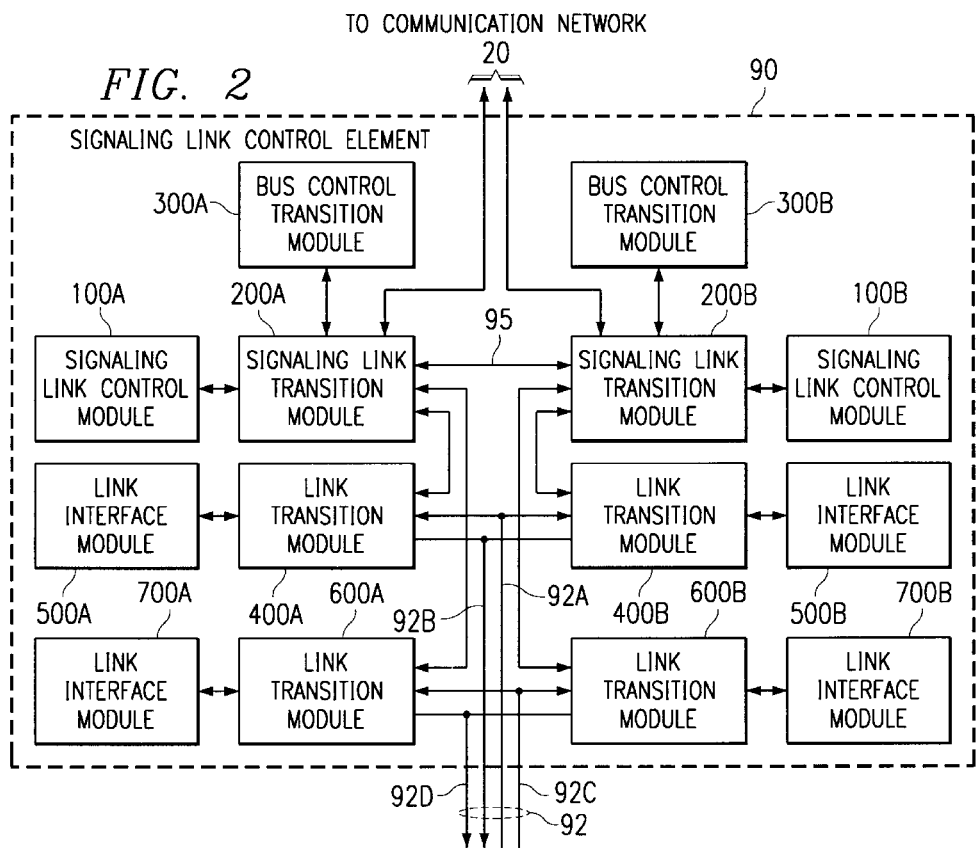

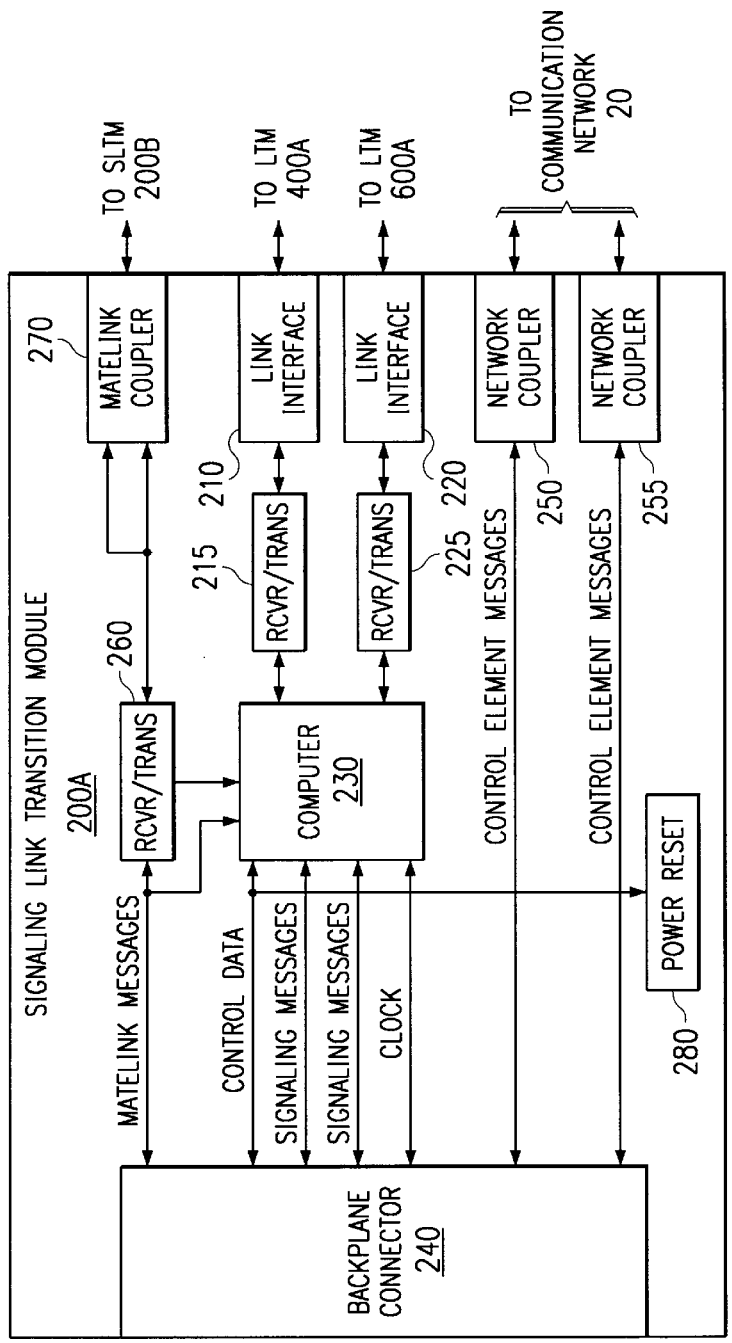
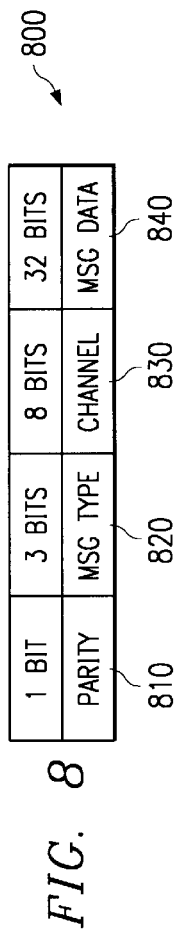
FIG. 5
FIG. 8

METHOD AND SYSTEM FOR PROVIDING REDUNDANCY FOR SIGNALING LINK MODULES IN A TELECOMMUNICATION SYSTEM

TECHNICAL FIELD OF THE INVENTION

This invention relates to telecommunication systems and, more particularly, to providing redundancy for signaling link modules in a telecommunication system.

BACKGROUND OF THE INVENTION

Signaling points in telecommunication networks, such as Signal Transfer Points and Service Control Points, are continuing to become more complex because they are increasingly handling more signaling links and different types of signaling links. In addition, signaling points are becoming more complex because they are providing more sophisticated services, such as Local Number Portability (LNP) and Global Title Translation (GTT).

Unfortunately, as signaling points become more complex, they also become more difficult to manage because there are more components, interfaces, and signaling links that need to be managed and maintained. Further, as the signaling points become more complex, each signaling point becomes ever more critical to overall performance of the telecommunication system, mandating that they rarely be inoperative.

Thus, a signaling point that has advanced functionality for managing, controlling, and maintaining signaling links and/or that has a reliable configuration is desirable.

SUMMARY OF THE INVENTION

The present invention provides a method and apparatus that substantially reduces or eliminates at least some of the disadvantages and problems associated with prior art methods and apparatuses for providing redundancy for signaling link modules in a telecommunication system. Accordingly, in particular embodiments, the present invention provides a method and apparatus that can provide redundancy for signaling link modules in a telecommunication system.

In particular embodiments, the present invention provides a system for managing signaling messages in a telecommunication system. The system includes a first control module and a second control module. The first control module is operable to receive signaling messages from a plurality of signaling links, process the signaling messages, and send the processed signaling messages through a communication network interface. The second control module is operable to receive the signaling messages from the plurality of signaling links, process the signaling messages, and send the processed signaling messages through a communication network interface. The system also includes a Matelink that is coupled to the first control module and the second control module. The Matelink is operable to communicate the status of the first control module to the second control module and the status of the second control module to the first control module. The first control module and the second control module are further operable to be in either an active mode or a standby mode, only one of the first control module and the second control module being in the active mode at one time, the control module in the active mode sending the processed signaling messages through the associated communication network interface and the status messages over the Matelink.

In other embodiments, the present invention provides a method for managing signaling messages in a telecommunication system. The method includes receiving signaling messages from a plurality of signaling links at a first control module and processing the signaling messages at the first control module. The method also includes sending the processed signaling messages from the first control module through a communication network interface. The method further includes receiving the signaling messages from the plurality of signaling links at a second control module and processing the signaling messages at the second control module. The method additionally includes sending status messages for the first control module to the second control module, the first control module being in an active mode and the second control module being in a standby mode.

The present invention provides several technical advantages. For example, in particular embodiments, the present invention allows individual signaling links to be tested and, if necessary, disabled. As another example, in particular embodiments, the present invention allows a group of signaling links to be disabled simultaneously. As a final example, in certain embodiments, the present invention provides for redundancy of the modules managing the signaling messages on the signaling links.

Other technical advantages will be readily apparent to one skilled in the art in view of the following FIGUREs, description, and claims.

BRIEF DESCRIPTION OF THE DRAWINGS

The present invention can be more readily understood by referring to the accompanying drawings, in conjunction with the following detailed description:

FIG. 1 illustrates one embodiment of a system for controlling signaling links in a telecommunication system;

FIG. 2 illustrates a more detailed view of one embodiment of a Signaling Link Control Element for the system in FIG. 1;

FIG. 5 provides a more detailed view of one embodiment of a Signaling Link Transition Module for the Signaling Link Control Element in FIG. 2;

FIG. 8 illustrates one embodiment of a Matelink message; and

DETAILED DESCRIPTION OF THE INVENTION

Figure 3:
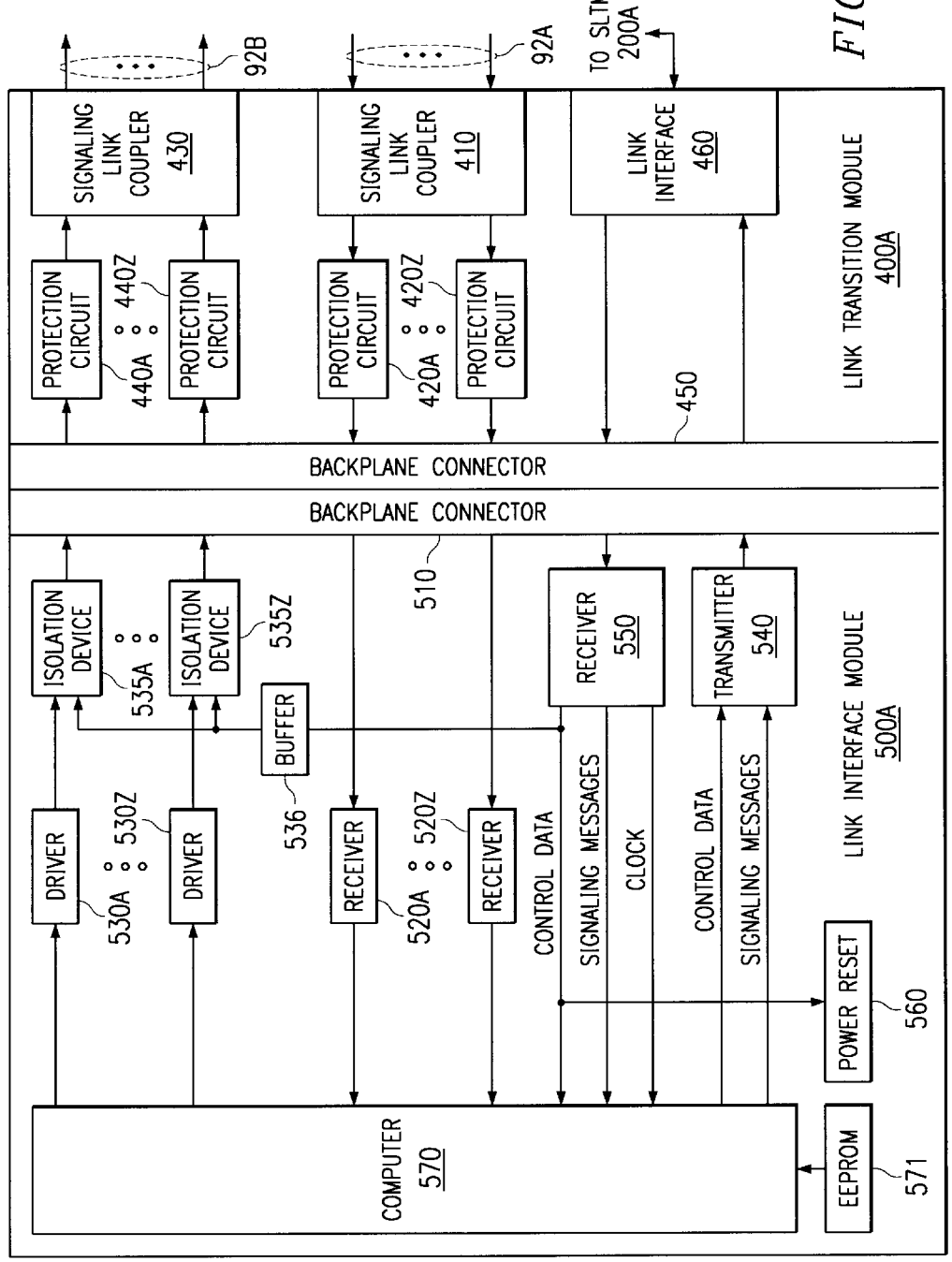
FIG. 3 provides a more detailed view of a Link Transition Module and a Link Interface Module for the Signaling Link Control Element in FIG. 2.

FIG. 1 illustrates one embodiment of a system 10 for controlling signaling messages in a telecommunication network. In general, system 10 is intended to initiate, terminate, and/or switch signaling messages. As illustrated, system 10 includes a variety of control elements (CEs), such as a Peripheral and Load Control Element (PLCE) 70 and a Signaling Services Control Element (SSCE) 40, coupled together by a communication network 20. Each CE performs discrete functions in the control and maintenance of particular devices and in the control of signaling, administrative, or maintenance functions in system 10. The CEs may be coupled to communication network 20 by serial or parallel analog links, digital links, or any other type of link that can electrically or electromagnetically communicate signals.

In certain embodiments, system 10 could serve as a stand-alone signal transfer point (STP) in a common channel signaling (CCS) network. Thus, system 10 could provide level two error detection-correction on signaling messages and level three network routing functions for the signaling messages, as well as other services, such as Global Title Translation (GTT) and Local Number Portability (LNP). In particular embodiments, system 10 supports Signaling System 7 (SS7) signaling messages. In a specific one of these embodiments, system 10 also supports European (ITU) and Japanese versions of Level 2 Signaling Link Function. In other embodiments, system could serve as a signaling point (SP) in an S12 signaling network. In still other embodiments, system 10 may provide signaling services for a variety of other protocols, such as Internet protocol (IP). System 10 could also be useful in a wide variety of other signaling systems and/or switching systems.

Communication network 20 may be an Ethernet network, an asynchronous transfer mode (ATM) network, a frame relay network, or any other type of network that can electronically or electromagnetically exchange information. In particular embodiments, communication network 20 includes two one-hundred megabit Ethernet switches, for reliability purposes, each switch being connected to the other switch by one gigabit link. Moreover, all CEs and all peripheral equipment affecting more than one signaling link are configured redundantly, which prevents any signal point of failure from affecting the operation of system 10. Communications between CES may use Real-Time Bearer Protocol (RTB), Internal Package Protocol (IPP), TCP/IP, or any other suitable messaging protocol.

In more detail, PLCE 70 provides maintenance and surveillance functions of all control processors and peripheral equipment provided in system 10. Accordingly, PLCE 70 is a logical master control element of system 10. PLCE 70 provides system initialization and loading, man-machine communications (MMC), operation support system (OSS) service inputs, control of mass storage peripherals, central configuration management, central control fault management, central control test management, event reporting, alarm management, core/crash file management, and clock management. For example, PLCE 70 provides system initialization for all of the processors and devices in system 10 beginning from power-up. As another example, PLCE 70 processes user commands and dispatches them to the proper subsystem. As a further example, PLCE 70 provides maintenance processing on processors and devices and changes the state of devices to remove/restore them from/to service. As a final example, PLCE 70 receives and processes faults detected in system 10 and coordinates the removal of faulty devices from service. PLCE 70 may also include a variety of other functionality.

A signal management control element (SMCE) 30 manages the signaling subsystem. In specific, SMCE 30 provides signaling route management, signaling traffic management, signaling provisioning, and signaling connection control part (SCCP) management.

SSCE 40 contains logical databases and screening services for the signaling subsystem. However, SSCE 40 controls no signaling related hardware. In addition, SSCE 40 can provide local number portability (LNP) services. In embodiments where system 10 supports SS7 messages, SSCE 40 can also provide SCCP with Global Title Translation (GTT), gateway screening, and message transfer part (MTP) buffering and routing.

Signaling link control elements (SLCEs) 90 control signaling link hardware to provide signaling link management. In particular embodiments, SLCEs 90 control SS7 link hardware and contain up through MTP Level 3 functionality. In some of these embodiments, SLCEs 90 provide SCCP functionality, GTT with SCCP, and gateway screening. Each SLCE 90 has a plurality of signaling links 92 that communicate signaling messages from/to other network points, such as a Central Office (CO). SLCEs 90 also communicate the signaling messages to the appropriate CE. In particular embodiments, signaling links 92 are part of an implementation of a Digital Data System (DDS) between an STP or SS and a remote STP or SS.

A traffic metering and measurement control element (TMMCE) 50 contains the central collection mechanism of all measurement data collected in system 10.

A database management control element (DMCE) 60 contains the local number portability (LNP) and application location register (ALR) database management and monitoring functions for SSCE 40 hardware. DMCE 60 controls no signaling related hardware.

System 10 also includes operations, administration, and maintenance (OAM) agent 80. OAM agent 80, which is also coupled to communication network 20, provides the primary OAM functionality for system 10. Accordingly, OAM agent 80 is the uppermost component in the logical control hierarchy for OAM. OAM agent 80 provides GUI user interfaces and OSS services and passes data to/from PLCE 70 via communication network 20. In the embodiment illustrated in FIG. 1, OAM agent 80 is not a CE, and hence, PLCE 70 does not control or provision it. However, PLCE 70 is not dependent on OAM agent 80 to provide control to the rest of the system.

In a particular embodiment, all CEs in system 10 include Mobile Pentium II based processors on compact Peripheral Component Interconnect (CPI) form factor cards. Each card contains two Ethernet ports for communicating with system 10 and accepts an S12 daughtercard for connection to the S12 Digital Switching Network (DSN). SLCEs 90 also accept an SS7 daughtercard. The daughtercards conform to IEEE P 1386.1 and PICMG 2.1 CPI specifications for board profile and connectorization. The software in the CEs is layered in the standard S12 organization and contains the standard S12 operating system and applications. However, the CEs could have a variety of other structures and configurations.

Although a variety of functions have been discussed with respect to each CE, each CE could also include additional or fewer functions. Moreover, the functions discussed could be redistributed among the discussed CEs, combined into fewer CEs, or split between more CEs. In addition, not all of the functions and/or CEs need to be in a system in accordance with the present invention.

FIG. 2 illustrates a more detailed view of one embodiment of SLCEs 90 for system 10. As can be seen, signaling links 92 include input links 92A, output links 92B, input links 92C, and output links 92D. Input links 92A and output links 92B form one set of signaling links, and input links 92C and output links 92D form another set of signaling links. As can also be seen SLCE 90 includes a variety of modules. Signaling messages arriving from communication network 20 are first received by a signaling link transition module (SLTM), such as SLTM 200A, which provides a physical link interface for signals in SLCE 90. Coupled to SLTM 200A is a signaling link control module (SLCM) 100A, which provides the primary control mechanism for one plane, the "A-plane," of SLCE 90. Also coupled to SLTM 200A is a bus control transition module (BCTM) 300A, which distributes timing and reference clock signals for the A-plane of SLCE 90. BCTM 300A also distributes a reset signal to the modules in the A-plane. PLCE 70 controls BCTM 300A. SLTM 200A is also coupled to a link transition module (LTM) 400A, which provides a physical interface for input links 92A and output links 92B. Thus, LTM 400A provides coupling to the input links 92A, the output links 92B, and SLTM 200A. Coupled to LTM 400A is a link interface module (LIM) 500A. LIM 500A formats signaling messages from input links 92A for SLCM 100A and formats signaling messages from SLCM 100A for output links 92B. Together, LTM 400A and LIM 500A provide a physical interface between input links 92A and output links 92B and SLCM 100A. Also coupled to SLTM 200A is an LTM 600A, which is coupled to an LIM 700A. LTM 600A and LIM 700A allow the A-plane of SLCE 90 to handle twice as many signaling links 92 when they are installed in SLCE 90. Additional LTM/LIM pairs could be installed to handle more signaling links 92.

Note that SLCE 90 also has a corresponding set of modules—SLCM 100B, SLTM 200B, BCTM 300B, LTM 400B, LIM 500B, LTM 600B, and LIM 700B. These modules are exact duplicates of the previously described modules and are intended to provide redundancy in case an error occurs in one of the modules in the A-plane. Thus, SLCE 90 is divided into two planes, the A-plane and the B-plane.

In particular embodiments, there is a bi-directional link 95 coupled between SLTM 200A and SLTM 200B. Link 95 is called a "Matelink." The purpose of the Matelink is to keep the standby SLCM synchronized with the active SLCM to provide timely detection of a failure on the active plane in order to possibly take over operation and handling of signaling messages, a "switchover". To accomplish this, link 95 communicates data related to the operation of each signaling link 92 in background to the standby plane. Data may include hardware status, software status, signaling link status, receive sequence numbers, transmit sequence numbers, and/or any other appropriate information. Note that both planes are coupled to each of signaling links 92. Thus, SLCM 100A and SLCM 100B both receive signaling messages from signaling links 92. In addition, both SLCM 100A and SLCM 100B receive signaling messages through communication network 20 to be communicated over signaling links 92. However, communication is only performed by the active plane.

In operation, a signaling message on one of the input links in one set of signaling links, such as input links 92A, is received by two LTMs, such as LTM 400A and LTM 400B, where it is passed to an associated LIM, such as LIM 500A and LIM 500B. The LIMs reformat the signaling message from the input link and send it to SLTM 200A and SLTM 200B, respectively. SLTM 200A and SLTM 200B then transfer the reformatted signaling message to SLCM 100A and SLCM 100B, respectively. SLCM 100A and SLCM 100B again reformat the signaling message. However, only one of SLCM 100A and SLCM 100B sends the twice reformatted signaling message to SMCE 30 through communication network 20.

In reverse, a signaling message from communication network 20, bound for one of the output links, such as one of output links 92B, is first received by SLTM 200A and SLTM 200B. The signaling message is then sent to SLCM 100A and SLCM 100B. SLCM 100A and SLCM 100B then reformat the signaling message and send it to either LTM 400A and LTM 400B or LTM 600A and LTM 600B through SLTM 200A and SLTM 200B, respectively. The receiving LTMs then send the signal to their associated LIMs. Then, the receiving LIMs reformat the signaling message for communication over the appropriate one of signaling links 92. However, only one of the receiving LIMs sends the reformatted signaling message on the appropriate one of the output links.

In addition, SLCM 100A and SLCM 100B are responsible for controlling signaling links 92. In particular embodiments, SLCM 100A and SLCM 100B trigger link alignment for signaling links 92, after receiving a message that initialization is complete. Also, SLCM 100A and SLCM 100B are responsible for maintenance/failure/recovery. In addition, this function is responsible for testing signaling links 92. In embodiments where SLCM 100A and SLCM 100B support SCCP, SLCM 100A and SLCM 100B also perform SCCP routing functions. With SCCP, SLCM 100A and SLCM 100B can also support GTT and LNP services.

SLCM 100A and SLCM 100B also control loopback and transmission disabling functions for each respective plane. For example, in particular embodiments, SLCM 100A can generate commands that are sent to SLTM 200A and/or LIM 500A to establish loopback between SLCM 100A and SLTM 200A, SLTM 200A and a remote signaling point, SLCM 100A and LIM 500A, or LIM 500A and a remote signaling point. A variety of other loopback may also be established. During loopback, the data received at the end of the loop is compared to the communicated data to determine if any errors are present in SLCE 90, to isolate the errors, and, possibly, to determine the cause of the errors. In addition, SLCM 100A can generate commands to disable the communication of signaling messages from LIM 500A to output links 92B. In certain embodiments, the SLCM in the standby plane, such as SLCM 100B, can also generate commands to disable these communications by the active LIMs, such as LIM 500A, and send them to the active LIMs through the Matelink. In particular embodiments, these commands cause a relay to break the coupling of the LIMs in the active plane to the output links. The loopback and communication disables can be removed upon assertion of a reset signal from an SLCM.

In particular embodiments, SLCE 90 supports SS7 signaling messages. In some of these embodiments, SLCE 90 can also support additional signaling message protocols, such as S12 or IP.

FIG. 3 provides a more detailed view of LTM 400A and LIM 500A for the illustrated embodiment of SLCE 90. In general, LTM 400A provides connectorization of LIM 500A to input links 92A, output links 92B, and SLTM 200A. LIM 500A, in turn, provides collation and distribution of signaling messages.

As illustrated, LTM 400A includes a signaling link coupler 410 for terminating input links 92A. LTM 400A also includes a plurality of protection circuits 420A–Z, one for each of input links 92A, because LTM 400A and LIM 500A must continue to operate after application of specific metallic, longitudinal, and short circuit stresses. In particular embodiments, each of protection circuits 420A–Z provides this protection with three SMBJ10CA transient voltage suppressors (TVS) devices, although numerous other protection circuits well known to those skilled in the art could also be used. LTM 400A also includes a signaling link coupler 430 for terminating output links 92B. Coupled to signaling link coupler 430 are protection circuits 440A–Z, one for each of output links 92B. Protection circuits 440A–Z are configured similarly to protection circuits 420A–Z. In some embodiments, however, protection circuits 420A–Z and protection circuits 440A–Z are not required. Signaling link coupler 410 and signaling link coupler 430 can be any type of connector well known to those skilled in the art, and in a particular embodiment are high-density mini-sub P connectors. LTM 400A also includes a link interface 460. Link interface 460 provides a physical interface for communicating electrical signals between LIM 500A and SLTM 200A. LTM 400A receives control data, signaling messages, and clock signals through link interface 460. LIM 500A sends control data, which includes status information, and signaling messages through link interface 460. LTM 400A further includes a backplane connector 450 for relaying messages to/from LIM 500A. Backplane connector 450 is coupled to signaling link coupler 410, signaling link coupler 430, and link interface 460. Backplane connector 450 may be a Peripheral Component Interconnect (CPI) connector, an Industry Standard Architecture (ISA) connector, or any other type of connecter that can exchange electrical or electromagnetic signals.

LIM 500A, as illustrated, includes a backplane connector 510, which corresponds to backplane connector 450. In particular embodiments, backplane connector 510 and backplane connector 450 provide a hot-swap capability. An LTD 1422 hot-swap controller can provide for control of the FET soft start circuitry. In some of these embodiments, backplane connector 510 and backplane connector 450 use the standard CPI backplane connectors J1–J5. Backplane connector 510 allows LIM 500A to exchange signals with LTM 400A. Coupled to backplane connector 510 are a plurality of receivers 520A–Z, each corresponding to one of protection circuits 420A–Z and, hence, input links 92A. Receivers 520A–Z receive signaling messages from protection circuits 420A–Z and place them into a format appropriate for a computer 570, which is coupled to each of receivers 520A–Z. Computer 570, which is an Alter 6024A FPGA in particular embodiments, provides an interface between input links 92A and SLTM 200A and between SLTM 200A and output links 92B and a variety of control functions in LIM 500A, and will be discussed in detail with respect to FIG. 4. Coupled to computer 570 are a plurality of drivers 530A–Z. Drivers 530A–Z generate signals that represent signaling messages for communication over output links 92B. Coupled to each of drivers 530A–Z is one of isolation devices 535A–Z. Isolation devices 535A–Z break the connection between each of drivers 530A–Z and output links 92B when enabled. In a particular embodiment, each of isolation devices 535A–Z is a form A solid state relay. In the illustrated embodiment, a buffer 536 that includes three BCR 503 high-current transistors buffers isolation devices 535A–Z.

Also coupled to computer 570 is a transmitter 540, which is operable to send signaling messages and control data to SLCM 100A through link interface 460. Further, a receiver 550 is coupled to computer 570. Receiver 550 receives signaling messages and control data from SLCM 100A and, in general, relays them to computer 570. Note, however, that a reset signal from SLCM 100A is routed to a power reset device 560, which will reset LIM 500A and LTM 400A. Computer 570 will be reinitialized by an EEPROM 571 during reset. In addition, a relay enable signal will activate isolation devices 535A–Z.

Input links 92A and output links 92B may be serial or parallel analog links, digital links, or any other type of links that can communicate electric or electromagnetic signals. In certain embodiments, each of signaling links 92 is a DS0A signaling link, which uses a four wire interface with a nominal impedance of one-hundred thirty-five Ohms. Each DS0A signaling link is a sixty-four kilobit per second synchronous data signal having a bipolar non-return to zero (NRZ) format. In addition, the "ones" are encoded using an Alternate Mark Inversion (AMI) scheme—the ones alternating between negative and positive voltages. The eighth bit in each data byte is assigned a network control function. The remaining seven bits in each data byte are available for data transmission. Therefore, the data transmission rate is fifty-six kilobits per second. In particular embodiments, twenty-four DS0A links couple to signaling link coupler 410 of LTM 400A, and the signaling messages from the twenty-four DS0A links are then multiplexed together by computer 570 and transmitted to SLCM 100A in a thirty-two channel byte-multiplexed serial stream at 2.048 megahertz, each DS0A link having one byte in each stream. In addition, LIM 500A receives a thirty-two channel byte-multiplexed serial stream with twenty-four data channels to be demultiplexed and communicated on the output DS0A links, output links 92B.

Drivers 530A–Z may be analog drivers, digital drivers, or any other type of device that can generate electrical or electromagnetic signals for communication to a remote point. In certain embodiments, all of drivers 530A–Z can receive a control signal from SLCM 100A that disables drivers. 530A–Z. In particular embodiments, each of drivers 530A–Z is an analog driver that accepts a transistor-transistor logic (TTL) control signal for both the positive and negative output marks, or pulses, from computer 570. Thus, when one of the control signals is asserted high, the corresponding transistor conducts. The communicated signal at signaling link coupler 430 will have an amplitude magnitude of less than seven-tenths of a Volt for a "zero" and an amplitude magnitude between three and five and one-half Volts for a "one."

Receivers 520A–Z may be analog receivers, digital receivers, or any other type of device that can detect electrical or electromagnetic signals. In particular embodiments, each of receivers 520A–Z accepts a positive and negative pulse from a DS0A tip and ring signal pair and can accept/detect the signal after it has passed through zero to one-thousand five-hundred feet of twenty-four gauge, twisted, shielded, cable. A pulse of one of input links 92A is transformer-coupled by a center-tapped transformer, producing a positive and negative output to two DS26C32 differential receivers.

Computer 570 includes a processor and a memory. The processor may be a complex instruction set computer (CISC), a reduced instruction set computer (RISC), a field programmable gate array (FPGA), or any other type of device that can electronically manipulate electronic information. The memory can be random access memory (RAM), read-only memory (ROM), compact disk read-only memory (CD-ROM), registers, and/or any other type of volatile or non-volatile magnetic or optical storage device.

The link between link interface 460 and SLTM 200A may be a serial or parallel analog link, digital link, or any other type of link that can communicate electric or electromagnetic signals. Note, SLCM 100A has direct control of isolation devices 535A–Z and the reset signal to power reset 560 through this link.

In particular embodiments, the signaling link between link interface 460 and SLTM 200A is a TP2 link. LIM 500A uses this link to exchange signaling messages, receive commands, and return status to SLCM 100A. As a TP2 interface, link interface 460 has a control interface and a data interface. Signals on the TP2 interface pass directly through LTM 400A without change. Thus, LTM 400A only provides connectorization of the TP2 interface for LIM 500A.

The TP2 data interface contains a thirty-two channel, byte multiplexed, duplex, serial data link between LTM 400A and SLTM 200A. The bit order in each byte corresponds to the order that the data was received on each of input links 92A or the order that the data is to be sent on each of output links 92B. In particular embodiments, however, only the first twenty-four channels are used, the remaining channels being zeroed, because only twenty-four input links 92A and twenty-four output links 92B are coupled to LIM 500A.

The TP2 control interface consists of a serial data stream, a message valid input signal, a serial output stream, and a message valid output signal. The data input stream and the message valid input signal are sent to computer 570, and the serial data output stream and message valid output signal are sent to SLTM 200A. The TP2 data input stream is formatted as an eight bit address field, an eight bit data field, a one bit read/control field, and a one bit parity field. The address and data are output LSB first. The output data stream contains data read from a memory of computer 570 or an error status signal. In addition, the control interface provides for an isolation device activation signal and a power reset signal.

The TP2 interface uses low voltage differential signaling (LVDS) technology. A characteristic impedance of one-hundred Ohms is preferred in some embodiments. The TP2 interface is loop timed using a 2.048 MHZ clock signal and synchronization signal from BCTM 300A or SLCM 100A. The clock period is 488 nanoseconds and all data is output on the rising edge of the clock period and sampled on the following edge of the clock period for both LIM 500A and SLCM 100A. Data may be output up to fifty nanoseconds after the rising clock edge and still maintain more than one-hundred nanoseconds of setup time prior to the following edge of the clock. Data output to SLCM 100A from LIM 500A will become valid no later than 43 nanoseconds, plus the clock to output delay and clock skew of SLCM 100A, after the rising 2.048 MHZ clock edge. In these embodiments, transmitter 540 is a TTL/LVDS translator, and receiver 550 is an LVDS/TTL translator. No protection is encoded into the TP2 data interface. The signaling algorithm will verify the data contents on a message by message basis for each channel. Note, SLCM 100A has direct control of isolation devices 535A–Z and the reset signal to power reset 560 through this interface. If no errors have occurred, computer 570 sends a message valid signal to SLCM 100A.

Although LTM 400A and LIM 500A have been illustrated as separate cards connected through backplane connectors, LTM 400A and LIM 500A may be constructed and configured in a variety of other manners. For example, all of the functionality of LTM 400A and LIM 500A may be placed on one card or distributed among several cards. In addition, some of the hardware may be replaced by software and/or some of the software may be replaced by hardware. A variety of other constructions and configurations exist.

Figure 4:
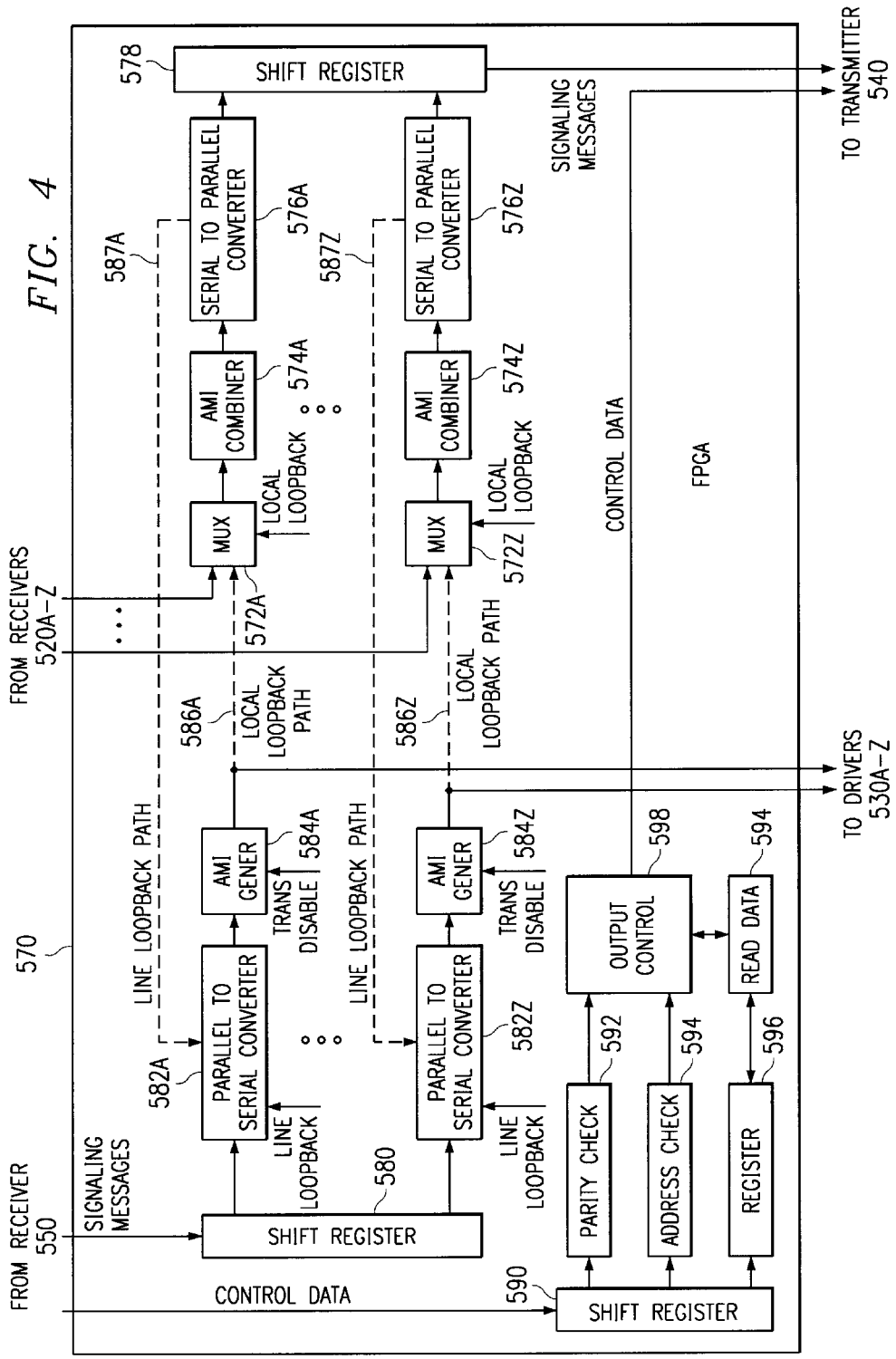
FIG. 4 provides a detailed view of one embodiment of a computer for the Link Interface Module in FIG. 3.

FIG. 4 provides a detailed view of one embodiment of computer 570 for embodiments where input links 92A and output links 92B are DS0A links and a TP2 interface is used between LTM 400A and SLTM 200A. Thus, computer 570 provides an interface between the TP2's multiplexed serial streams and the DS0A signaling links. As illustrated, computer 570 is an FPGA that includes multiplexers 572A–Z, alternative mark inverter (AMI) combiners 574A–Z, and serial to parallel converters 576A–Z, one set of each being associated with one of receivers 520A–Z. In operation, data is received from each of receivers 520A–Z as two TTL signals, the first representing "mark positive pulses" and the second representing "mark negative pulses." These signals are then "OR'ed" together without detection of bipolar violations to recreate the DS0A signal. The resultant signal is shifted into a data register for the channel. Then, the contents of each data register are copied into their multiplexed position in a shift register 578 and output to transmitter 540 in route to SLTM 200A. Shift register 578 may be sized according to the number of input links 92A. Thus, for twenty-four input links 92A, shift register 578 is one-hundred ninety-two bits.

In addition, FPGA 580 includes a shift register 580, which is the same size as shift register 578, parallel to serial converters 582A–Z, and AMI generators 584A–Z. In operation, shift register 580 receives the byte-multiplexed serial data stream from receiver 550 and outputs a different byte of the serial stream to each one of parallel to serial converters 582A–Z, each byte corresponding to a different channel. Each parallel to serial converter 582A–Z then converts the parallel bits into serial bits and outputs them to associated AMI generator 584A–Z, which then generates an AMI modulation scheme based on the bits. From each of AMI generators 584A–Z, a signal is passed to one of associated drivers 530A–Z for communication over output links 92B.

Computer 570 also receives control data from SLCM 100A and/or SLTM 200A through receiver 550. The control data consists of an eight bit address field, an eight bit data field, a one bit read/write control field, and a one bit parity field, for a total of eighteen bits. The control data is first received in a shift register 590. Then, the data is checked by a parity checker 592 and, if the control message specifies a write operation, an address checker 594. If a parity error has occurred, a parity error signal is output to SLCM 100A. Also, if the address to be written to is reserved or is read only, an address error signal is generated and passed to SLCM 100A. If either the parity error or the address error is detected, the control message's read or write operation is discarded. If no error has occurred, however, and if a write command has been specified, the data is written to an address register in register 596. For output, data is read from a register, whether a read or write operation was specified, and sent to SLCM 100A, along with a message valid signature.

Each channel, a channel corresponding to a signaling link, in LIM 500A has control bits on computer 570 to disable communications on its associated output link 92B, to establish a link loopback, and to establish a local loopback. All communication disables and all loopbacks can be removed upon assertion of a power reset signal to LIM 500A.

A transmission disable control bit can be set for each channel based on a command from SLCM 100A. Setting the transmission disable control bit for a particular channel disables the particular one of AMI generators 584A–Z associated with that channel, placing the associated one of drivers 530A–Z in a high-impedance state. In addition, by setting all of the transmission control bits at once, all of the AMI generators 584A–Z can be disabled simultaneously. This function is typically used when the A-plane of SLCE 90 will be transitioning from the active to the standby mode, requiring drivers 530A–Z to stop sending signaling messages over output links 92B. Thus, SLCM 100A can instruct LIM 500A to stop sending DS0A signaling messages over all of output links 92B when the A-plane of SLCE 90 will be in the standby mode. Note, this control signal has no effect on signaling messages received from receivers 520A–Z.

When both the link loopback control bit and the local loopback control bit are not asserted, signaling messages are communicated from receivers 520A–Z to transmitter 540 and from receiver 550 to drivers 530A–Z. However, when the local loopback control bit is asserted for a particular channel by SLCM 100A, data received from receiver 550 for that channel is returned to transmitter 540 over one of local loopback paths 586A–Z. This local loopback is accomplished by the corresponding one of multiplexers 572A–Z, such as multiplexer 572A, selecting the AMI encoded output signals bound for a driver, such as driver 530A, instead of the AMI encoded data from a receiver, such as receiver 520A. During local loopback, data received from SLCM 100A for the channel undergoing loopback is also output to the corresponding one of drivers 530A–Z, but data received for the channel from the corresponding one of receivers 520A–Z, such as receiver 520A, is discarded.

When SLCM 100A asserts the link loopback control bit for a channel, data received from the corresponding one of receivers 520A–Z is returned to the corresponding one of drivers 540A–Z, over one of link loopback paths 587A–Z. This loopback allows the contents from one of serial to parallel converters 576A–Z to be copied to a corresponding one of parallel to serial converters 582A–Z through one of link loopback paths 587A–Z. Thus, the signaling messages received from one or more of receivers 520A–Z are again output to the corresponding one or more of drivers 530A–Z. During link loopback, signaling messages received from receivers 520A–Z for the channel undergoing loopback are also output to transmitter 540. However, signaling messages received from receiver 550 for the channel are discarded.

FIG. 5 provides a more detailed view of one embodiment of SLTM 200A for this embodiment of SLCE 90. As illustrated, SLTM 200A provides a physical interface between SLCM 100A and LTM 400A, between SLCM 100A and LTM 600A, between SLCM 100A and SLCM 100B, and between SLCM 100A and communication network 20.

SLTM 200A includes a link interface 210 and a link interface 220. Link interface 210 and link interface 220 couple SLTM 200A to LTM 400A and LTM 600A, respectively. Coupled to link interface 210 is a receiver/transmitter 215, and coupled to link interface 220 is a receiver/transmitter 225. Receiver/transmitter 215 and receiver/transmitter 225 can be an analog receiver/transmitter, a digital receiver/transmitter, or any other type of device that can send and receive electrical or electromagnetic signals. A computer 230 is coupled to both receiver/transmitter 215 and receiver/transmitter 225. Computer 230, which is an SRAM based Alter a FPGA in certain embodiments, manages the control data and signaling messages between SLCM 100A and LTM 400A/LIM 500A through link interface 210 and between SLCM 100A and LTM 600A/LIM 700A through link interface 220.

In particular embodiments, link interface 210 and link interface 220 have a message interface and a control interface. In some of these embodiments, the interfaces are SCSI fine pitch D connectors. In general, the functions provided to LTM 400A/LIM 500A and LTM 600A/LIM 700A by computer 230 are identical. Thus, the following discussion will center on LTM 400A/LIM 500A.

In addition, computer 230 provides loopback capabilities from SLCM 100A to SLCM 100A and from LIM 500A to LIM 500A. When not in loopback mode, the control data and signaling messages are passed from LIM 500A to SLCM 100A and from SLCM 100A to LIM 500A.

Computer 230 interfaces with SLCM 100A through a backplane connector 240. By doing so, SLTM 200A terminates the control and message interfaces from SLCM 100A. Note, SLTM 200A provides two message paths to and from SLCM 100A.

Each of these paths may either be serial or parallel analog links, digital links, or any other type of link that can communicate electrical of electromagnetic signals. Each path contains one set of transmit signals and one set of receive signals.

Computer 230 is also coupled to BCTM 300A through backplane connector 240. Computer 230 receives timing signals from BCTM 300A via backplane connector 240. In particular embodiments, computer 230 receives these signals via low voltage single ended TTL (LCX) technology. BCTM 300A sends a 19.44 MHZ clock signal, a 19.44 MHZ superframe indicator (SFI), and an 8.192 MHZ clock signal aligned with the 19.44 MHZ clock signal. Computer 230 uses the 8.192 MHZ clock signal to produce the 2.048 MHZ clock signal for use with the TP2 interface to STM 400A. Computer 230 also passes these clock signals to SLCM 100A.

Also coupled to backplane connector 240 is a receiver/transmitter 260. Coupled to receiver/transmitter 260 is a Matelink coupler 270. In particular embodiments, Matelink coupler 270 is a SCSI fine pitch D connector. In general, SLTM 200A passes the Matelink interface signals from backplane connector 240 to Matelink coupler 270 and from Matelink coupler 270 to backplane connector 240. However, SLTM 200A provides a signal trace interconnect for a Matelink detection signal from SLTM 200B, sends a plane enable switchover signal from SLCM 100A to computer 230, and sends a relay enable signal from SLCM 200B to computer 230. In general, synchronization messages are sent over the Matelink. Thus, the Matelink allows signaling link state machines to stay synchronized so that if an error occurs on the active plane, the standby plane can assume responsibility for the signaling links 92. The Matelink signals are originated by both SLCM 100A and SLCM 100B. The Matelink is not monitored or maintained outside of SLCE 90.

Backplane connector 240 is also coupled to a network coupler 250 and a network coupler 255. Network coupler 250 and network coupler 255 couple SLTM 200A and, hence, SLCM 100A to communication network 20. In a particular embodiment, network coupler 250 and network coupler 255 are Ethernet interfaces, such as RJ 45 ports and transformers.

SLTM 200A also includes a power reset 280. Power reset 280 can be activated through control data received from SLCM 100A. Activating power reset 280 also asserts the power reset signal to power reset 560 of LIM 500A through link interface 210.

Computer 230 includes a processor and a memory. The processor may be a CISC, a RISC, an FPGA, or any other type of device that can electronically manipulate electronic information. The memory may be RAM, ROM, CD-ROM, registers, and/or any other type of volatile or non-volatile magnetic or optical storage device.

Receiver/Transmitter 260 may be an analog receiver/transmitter, digital receiver/transmitter, or any other type of receiver/transmitter that can receive and send electrical or electromagnetic signals. In particular embodiments, receiver/transmitter 260 uses LVDS technology with an impedance of one-hundred Ohms for all Matelink signals.

In operation, SLTM 200A receives signaling messages from LTM 400A through link interface 210. The signaling messages from LTM 400A are then sent to receiver/transmitter 215, which detects them and sends them to computer 230. Computer 230 then passes the signaling messages and control data to SLCM 100A. In addition, through a reverse, though similar, process computer 230 receives signaling messages and control data from SLCM 100A and pass them to LTM 400A. Thus, SLTM 200A terminates the serial command interface from SLCM 100A.

In particular embodiments, the message interfaces between SLCM 100A and computer 230 are serial interfaces with two links—one for sending messages to SLTM 200A from SLCM 100A and one for sending messages to SLCM 100A from SLTM 200A. Clock, frame, and message signals are included in each direction. For embodiments where signaling links 92 are DS0A links, eight bits of data may be contained in each channel.

In particular embodiments, the control path consists of two serial links, one from computer 230 to backplane controller 240 and one from backplane connector 240 to computer 230. The serial interface format to SLTM 200A consists of a twelve bit address field, followed by an eight bit data field, a read/write indicator bit, and a parity bit. In response to either a read or a write, SLTM 200A returns an eight bit data field, a transaction pass/fail indicator, and a parity bit.

In operation, computer 230 extracts the control data for each SLCM 100A command operation from the serial bit stream. Computer 230 then performs a parity check and, if successful, an address decode function on the received address to determine if the access is local or pertaining to link interface 210. If the access is determined to be local, computer 230 performs the commanded operation on its local memory map function and returns a status response.

If, however, the access is to link interface 210, computer 230 stores the information on a local memory mapped register, which is then converted to a proper format for LIM 500A and sent through link interface 210. Once LIM 500A returns a response, computer 230 verifies the response, for example, by performing a parity check, and returns a status message to SLCM 100A. For all read operations of LIM 500A, computer 230 returns the actual data from LIM 500A or the local register. For write operations, computer 230 returns a combined status message of ten bits that contains the pass/fail indication of the write operation. The data field also contains a pass/fail bit for the interface between link interface 210 and LIM 500A in both directions and a pass/fail bit for SLTM 200A read from SLCM 100A and an address error. At any time during normal processing, if computer 230 detects an error, the status response message is used to alert SLCM 100A of the error condition. In addition, computer 230 monitors whether LTM 400A is present by monitoring the activity of the data signals from the module. If a lack of data is detected, SLCM 100A is notified with an error signal.

In addition, SLTM 200A receives messages generated by SLCM 100A for one of the control elements coupled to communication network 20. SLTM 200A relays these signals from backplane connector 240 to communication network 20 through one or both of network coupler 250 or network coupler 255.

Further, SLTM 200A receives Matelink signals bound for SLCM 100B or SLCM 100A. SLTM 200A sends these signals to SLTM 200B through Matelink coupler 270 using receiver/transmitter 260. In addition, SLTM 200A receives Matelink signals from SLCM 100B through Matelink coupler 270. These signals are, generally, then received at receiver/transmitter 260 and sent to SLCM 100A. However, Matelink coupler 270 provides a loopback of a particular control signal from SLCM 100B. This loopback control signal does not require power to be available in SLTM 200A or SLCM 100A. Thus, if SLCM 100B sends this signal to SLTM 200A and does not receive a return signal, SLCM 100B will know that the Matelink cable has come unplugged from Matelink coupler 270. Further, receiver/transmitter 260 provides a path to computer 230. This path is used when SLCM 100B wishes to disable the ability of LIM 500A and LIM 700A to transmit signals to output links 92B and output links 92D, respectively. This control signal from SLCM 100B is passed to control computer 230, which then passes a signal to LTM 400A. After this signal reaches LTM 400A and LTM 600A, it activates isolation devices, such as isolation devices 535A–Z, to disable the ability of LIM 500A and LIM 700A to send signaling messages over output links 92B and 92D.

The relay enable function is actually a combination of the states of two control signals. The control signal that enables the devices, therefore, is only asserted by computer 230 when both the signals are present. The first control signal must be asserted by SLCM 100A and indicates that a plane change is occurring. The second control signal is the relay enable signal from SLCM 100B, just discussed.

In addition, computer 230 can be used to loopback information to SLCM 100A and LIM 500A. In normal operations, computer 230 passes the data between SLCM 100A and LIM 500A. However, computer 230 can be configured to loopback message data from SLCM 100A and message data from LIM 500A. Note, these operations are not mutually exclusive, and therefore, computer 230 can only be set to loopback both message paths simultaneously.

In a particular embodiment, receiver/transmitter 215 and link interface 210 form a TP2 interface with LTM 400A. The TP2 interface, as previously discussed, receives and transmits serial data streams at 2.048 MHZ between SLTM 200A and LTM 400A.

The TP2 interface has a message interface and a control interface. The message interface uses a thirty-two channel, byte multiplexed, duplex, serial link to communicate messages between SLTM 200A and LTM 400A. Note, only some of the channels are used in certain embodiments, the unused channels being zeroed. The message interface has four signals—an output message stream, an input message stream, a frame synchronization signal, and a clock signal. The control interface, in turn, provides a control/status link to LTM 400A for command, control, and status information. The control interface uses a serial stream with an eight bit address field, an eight bit data field, a one bit read/write control field, and a one bit parity field, for a total of eighteen bits, to send control data to LIM 500A. Control data from LIM 500A includes error signals from failed memory writes or parity checks, data read from memory, a parity bit, and a message valid signal. In addition, the control interface supports an isolation device enable signal and a reset signal. The control interface can only support one operation at a time. The TP2 interface uses LVDS with a characteristic impedance of one-hundred Ohms for all command, control, data, and status signals to and from LTM 400A. Also in this embodiment, link coupler 210 is a SCSI fine pitch D connector. Accordingly, receiver/transmitter 215 is an LVDS to TTL translator and a TTL to LVDS translator.

Figure 6:
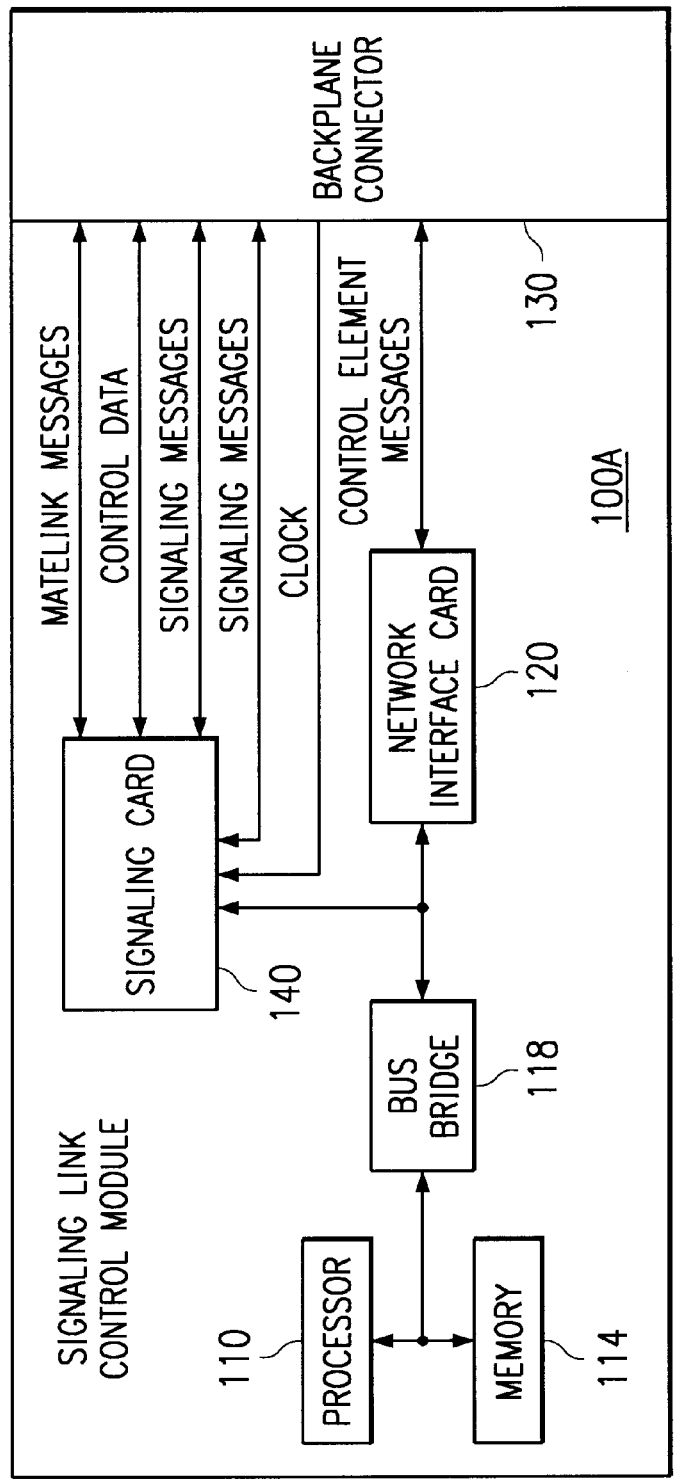
FIG. 6 provides detailed illustration of one embodiment of a Signaling Link Control Module for the Signaling Link Control Element in FIG. 2.

FIG. 6 provides a detailed illustration of one embodiment of SLCM 100A for SLCE 90 in FIG. 2. As illustrated, SLCM 100A includes a backplane connector 130, which corresponds to backplane connector 240. Coupled to backplane connector 130 is a Signaling Card 140. Signaling card 140 sends and/or receives Matelink messages, control data, signaling messages, and clock signals to/from SLTM 200A through backplane connector 130. Signaling card 140 processes signaling messages from signaling links 92 for communication network 20 and signaling messages from communication network 20 for signaling links 92. In addition, Signaling Card 140 receives system management communications through communication network 20 and provides hardware control to SLCE 90. Coupled to Signaling Card 140 is a bus bridge 118. Bus bridge 118 controls access to a processor 110 and a memory 114, coupled to bus bridge 118. Processor 110 provides higher level management of the signaling messages in SLCM 100A and routing functions for the signaling messages through communication network 20. Also coupled bus bridge 118 is a network interface card (NIC) 120, which is also coupled to backplane connector 130. NIC 120 formats messages from processor 110 for communication network 20. Accordingly, NIC 120 could be a Ethernet card, an ATM card, or any other type of device that can configure signals for communication across communication network 20.

In particular embodiments, backplane connector 130 and backplane connector 240 can provide a hot-swap capability. An LTD 1422 hot-swap controller can provide control of the FET soft start circuitry. In some of these embodiments, backplane connector 130 and backplane connector 240 use the standard CPI backplane connectors J1–J5. A variety of other devices also exist for coupling SLCM 100A to SLTM 200A.

Processor 110 may be a CISC, a RISC, an FPGA, or any other type of device that can electronically manipulate electronic information. Memory 114 can be RAM, ROM, CD-ROM, registers, and/or any other type of volatile or non-volatile magnetic or optical storage device. In addition, bus bridge 118 may be an ISA bus bridge, a PCI bus bridge, or any other type of bridge for a bus of processor 110. In particular embodiments, Signaling Card 140 may be a PCI Mezzanine Card. (PMC).

In order to preserve redundancy, all of the signaling messages received over signaling links 92 are transferred to both SLCM 100A and SLCM 100B. The signaling messages are fully processed by the active one of SLCM 100A and SLCM 100B, but are only partially on the standby. This allows both SLCM 100A and SLCM 100B to keep track of received signaling message sequencing numbers. Signaling messages received through communication network 20 are fully processed by both SLCM 100A and SLCM 100B.

Periodically, status information, such as the link status and the sequence number, for each of signaling links 92 is sent to the standby one SLCM 100A and SLCM 100B. The period of time is within the amount of time it takes for an SLCM to send the smallest signaling message to one of signaling links 92. Using the data received over the Matelink, the standby SLCM may use the sequence numbers that were last allocated and observed by the active SLCM.

In addition, errors that occur on the active SLCM are signaled to the standby SLCM over link 95. If the standby SLCM determines that a switchover is necessary, it initiates one. Moreover, the active SLCM may also determine that a switchover is required and signal the standby SLCM to perform the switchover.

In particular embodiments, Signaling Card 140 possesses MTP Level 2 (MTP-2) signaling link functionality and provides real-time MTP-2 processing functions for up to sixty-four sixty-four kilobit per second SS7 signaling links. In these embodiments, Signaling Card 140 supports Bellcore GR-246-CORE chapter T1.111.3 and ANSI T1.111.3 MTP-2 Signaling Link Function specifications and provides hardware control of the MTP-2 signaling link. In other embodiments, European (ITU) C7 and/or Japanese J1 versions of the Level 2 Signaling Link Function are also supported.

Although SLCM 100A and SLTM 200A have been illustrated as separate cards connected through backplane connectors, SLCM 100A and SLTM 200A may be constructed and configured in a variety of other manners. For example, all of the functionality of SLCM 100A and SLTM 200A may be placed on one card or distributed among several cards. In addition, some of the hardware may be replaced by software and/or some of the software may be replaced by hardware. A variety of other constructions and configurations exist.

Figure 7:
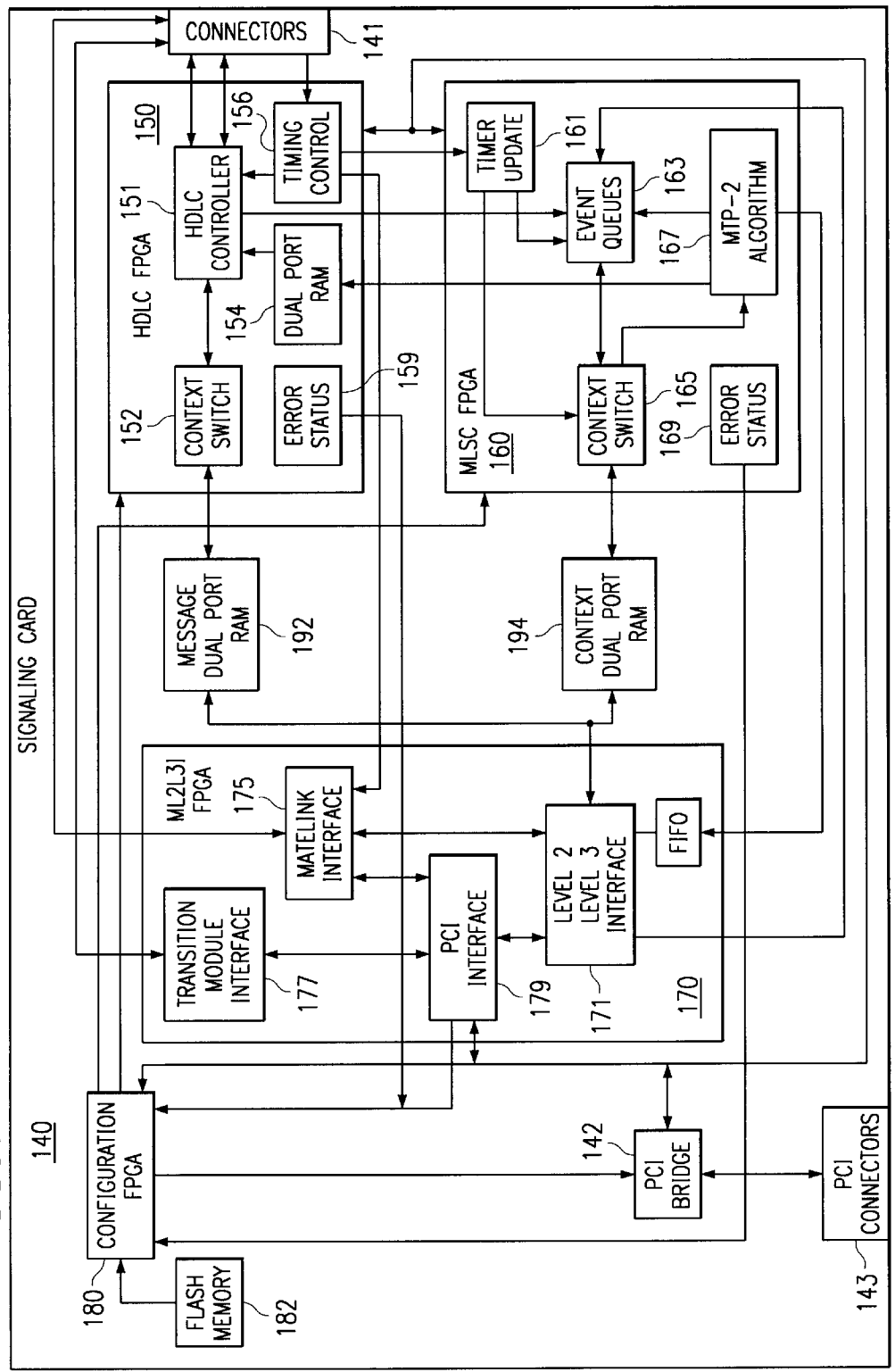
FIG. 7 illustrates one embodiment of a Signaling Card in the Signaling Link Control Module in FIG. 6 where the Signaling Link Control Element provides support for Signaling System 7 messages in DS0A signaling links.

FIG. 7 illustrates one embodiment of Signaling Card 140 in SLCM 100A where SLCE 90 provides support for Signaling System 7 messages in DS0A signaling links. As illustrated, Signaling Card 140 includes a High Level Data Link Control (HDLC) FPGA 150, an MTP-2 Link State Control (MLSC) FPGA 160, a Matelink Level 2 Level 3 Interface (ML2L3I) FPGA 170, and a Configuration FPGA 180. These FPGAs provide control and processing of signaling messages and Matelink messages. In this embodiment, ML2L3I FPGA 170 and Configuration FPGA 180 are memory mapped.

Signaling Card 140 also includes a Message Dual Port RAM (MRAM) 192 and a Context Dual Port RAM (CRAM) 194. MRAM 192, which is coupled to HDLC FPGA 150 and ML2L3I FPGA 170, stores signaling messages for retrieval by processor 110 or in preparation for transmission by HDLC FPGA 150. MRAM 192 also contains status information for HDLC FPGA 150. CRAM 194, which is coupled to MLSC FPGA 160 and ML2L3I FPGA 170, contains the current state information for all sixty-four MTP-2 channels. Processor 110 can access the second port of CRAM 194 through ML2L3I FPGA 170.

Signaling Card 140 further includes connectors 141 for coupling HDLC FPGA 150 to backplane connector 130 and PCI connectors 143 for coupling a PCI bridge 142 to processor 110. PCI bridge 142 may be designed in compliance with PCI Local Bus Specification Revision 2.1. Each of the FPGAs have PCI interfaces for accessing PCI bridge 142. A flash memory 182 is used to configure the FPGAs during initialization.

The links between the components in Signaling Card 140 may be serial or parallel analog links, digital links, or any other type of link that can convey electrical or electromagnetic signals.

HDLC FPGA 150 performs the physical layer support function for DS0A and timing, as well as HDLC-type functions for MTP-2. MRAM 192 stores signaling messages received by HDLC FPGA 150 for retrieval by processor 110 and signaling messages from processor 110 waiting to be transmitted by HDLC FPGA 150. MRAM 192 also contains status information for HDLC FPGA 150. ML2L3I FPGA 170 provides the interface to processor 110 on the second port of MRAM 192. HDLC FPGA 150 also has a parallel interface to MLSC FPGA 160 to provide status and event messaging to the MTP-2 state machines. HDLC FPGA 150 also provides all line timing support functions.

HDLC FPGA 150 includes an HDLC controller 151 that is coupled to two signaling message paths to SLTM 200A.

Each path has clock, frame, and multiplexed serial data in both the transmit and receive directions. In particular embodiments, the paths are serial data streams that operate at a frequency of 2.048 MHZ with eight bits from each of thirty-two channels per frame. While the hardware supports use of all thirty-two channels, any channels may be disabled as needed. In other embodiments, the paths are serial data streams that operate at a frequency of 1.544 MHZ with eight bits from each of twenty-four channels per frame, followed by one unused frame bit. Both paths should be of the same type.

HDLC FPGA 150 has a receive buffer for each channel. Data is written to the buffers serially eight bits at a time for each channel once every frame. Data is read from the buffers sixteen bits at a time. The data may consist of HDLC data of DS0A test data.

Each of the channels is provisioned as being enabled or disabled. An enabled channel indicates that some sort of data is being processed—in either normal or test mode. A channel in the normal mode processes HDLC data, and a channel in the test mode generates and/or receives DS0A test data. In the normal mode, while the channel is inactive, the incoming data is monitored for DS0A loopback codes from the far end. Only the data for one channel is processed at any time. At the beginning of each channel's allotted time slot, the state machines will be loaded from MRAM 192 with the previous states, which were stored during the previous frame. The data for the channel is read from the buffer and processed through the state machines. After the data has been processed, the state machines are stopped, and the current state is again stored in MRAM 192.

In general, HDLC FPGA 150 supports Bellcore GR-246-Core Chapter T1.111.7 channel test functions. Accordingly, there are several types of loopbacks that are available on HDLC FPGA 150. The channel remote loopback and the local loopback are defined and operate independently for each of the channels. The message path loopback is defined and operates independently for the two message paths. The message path cross connect loopback and the system channel cross connect loopback are defined globally.

The channel remote loopback loops back the received data to the transmit data for a particular channel. The receive data is also processed, but the transmit data is blocked.

The local loopback loops back the transmit data to the received data. The transmit data is also transmitted out the link, but the incoming data from the link is blocked.

The system channel cross connect loopback is intended to be used during normal operation to allow background tests to be performed on any two unused channels while normal processing is occurring on live channels.

The message path local loopback are independent for each message path. Each loopback connects the transmit message path directly to the receive message path, effectively looping back all channels in a particular message path. Transmit message path is still transmitted out, but the incoming message path is blocked.

The message path cross connect loopback cross connects to message paths to each other. For example, the transmit of one message path is connected to the receive of another message path. This loopback is intended for standalone verification of the functionality of the MTP-2 algorithm at a higher level than individual message path loopback.

HDLC FPGA 150 may establish latching loopback, non-latching loopback, or data only loopback. A latching loopback is set up by transmitting a particular DS0A control code. An external network element should recognize this pattern and loop the data back to HDLC FPGA 150. Once in place, the loopback remains until another particular sequence of DS0A codes is transmitted. Once set up, a data test pattern is transmitted, and the receiver monitors the incoming data for the same pattern and provides a status of the results to MRAM 192. A non-latching loopback is initiated by sending a control code for approximately one second, followed by an alternating pattern of one byte of the non-latching control code and one byte of test pattern. The loopback is removed by halting the transmission of the alternating patterns and transmitting an idle data pattern. The results are stored in MRAM 192. For data only loopback, HDLC FPGA 150 transmits a specified pattern and compares the incoming data against the transmitted pattern. No DS0A loopback codes are transmitted or monitored for. The actual loopback must be set up manually. Results are stored in MRAM 192. The results stored in MRAM 192 for each test may include pattern synchronization status, bit error count, errored frame count, number or frames transmitted, and number of frames received.

HDLC FPGA 150 also includes a transmit buffer for each channel. Each channel multiplexes the channels, twenty-four for DS0A, together form transmission to SLTM 200A.

HDLC FPGA 150 also includes an error status 150. When particular errors occur on HDLC FPGA 150, error status 150 reports the errors to Configuration FPGA 180. In particular embodiments, error status 150 can report thirty-two different errors to Configuration FPGA 180.

MLSC FPGA 160 performs the ANSI state machine functions for MTP-2. This includes handling signal unit selection, sequencing, alignment, timers, and TMM features. State machines, timers, and counters are handled as defined in ANSI T1.111.3, as well as the counts necessary for TMM reporting. In addition, MLSC FPGA 160 performs all aspects for MTP-2 Level 2 peer-to-peer flow control using Basic Error Correction and generates and terminates fill-in signal units (FISUs) and link status signal units (LSSUs). Note, however, that: 1) the delimitation, alignment, and error detection for receiving and transmitting blocks have been moved to HDLC FPGA 150; 2) ML3L2I FPGA 170 detects outages of processor 110; 3) preventative cyclic retransmission is not supported; and 4) the errored interval monitor is not supported. MLSC FPGA 160 operates on a single channel at a time by detecting events—any Level 3 input, HDLC input, or a timer event. As an event is detected for a link, data from CRAM 194 is loaded for the link, processed, updated, and put back into CRAM 194. Upon completing the operation on an event, an output is generated and passed to ML2L3I FPGA 170, HDLC FPGA 150, or Configuration FPGA 180.

MLSC FPGA 160 includes a timer update 161, event queues 163, a context switch 165, an MTP algorithm 167, and an error status 169. Timer update 161 provides a ten millisecond update to the timers. Event queues 163 provide a set of FIFOs for each event and a timer update function. Context switch 165 selects which event to process and loads MTP-2 algorithm 167 with a link's data from CRAM 194—state information, statistics, and timer values. HDLC events are processed immediately, followed by timer events, and L3 events, which are issued from processor 110. An HDLC event occurs whenever a command is issued from the HDLC FPGA 150, such as when a signaling message has been transmitted, received, or requested. A timer event occurs whenever a local timer expires. An L3 event consists of a command and a link for which it applied. MTP-2 algorithm 167 processes the MTP-2 function for the loaded link and updates any timers required. Once, MTP algorithm 167 finishes processing, context switch 165 stored the link's new state in CRAM 194. Error status 169 keeps track of any hardware errors, such as parity errors and FIFO overflows, and reports them to Configuration FPGA 180.

Each command from ML2L3I FPGA 170 is received in one, two, or three bytes. One byte is received if the command applies to all links (a global command), two bytes are received if the command applies to a single link, and three bytes are received if the command applies to the Matelink. Included as part of the command are a start bit and a parity bit.

Each command to ML2L3I FPGA 170 is stored in memory in ML2L3I FPGA 170. Each status that is sent in the form of two or six bytes. Two bytes are sent if a Level 2 status, MAM 192 status, or a test mode status is selected, and six bytes are sent if a Matelink status is selected.

In normal operation, ML2L3I FPGA 170 receives outbound signaling messages from processor 110 and stores them in MRAM 192. HDLC FPGA 150, in turn, transmits the message. MLSC FPGA 160 controls this process by providing a forward sequence number (FSN), stored in CRAM 194, for ML2L3I FPGA 170 (so that ML2L3I FPGA 170 will know which message to retrieve from processor 110) and by detecting when MRAM 192 is ready with a message to be transmitted. MLSC FPGA 160 then notifies HDLC FPGA 150 that a buffer is ready for transmission, sending a backward indicator bit (BIB), a backward sequence number (BSN), and a forward indicator bit (FIB). MRAM 192 contains two buffers for each links's outbound messages to allow one to transmit while the other is being filled.

In addition, HDLC FPGA 150 receives inbound messages from a link and stores the message in MRAM 192. MRAM 192 contains two buffers for each link's inbound messages. ML2L3I FPGA 170 then passes the message to processor 110. MLSC FPGA 160 controls this process by first detecting when MRAM 192 is ready with a message for processor 110. MLSC FPGA 160 is responsible for verifying the sequence numbers and indicator bits for the inbound messages. If the indicator bit indicates that the buffer was already full, an error signal is sent to Configuration FPGA 180. If a message is received correctly, MLSC FPGA 160 notifies ML2L3I FPGA 170 to transfer the message to processor 110. Otherwise, ML2L3I FPGA 170 is not notified, effectively discarding the message. Once ML2L3I FPGA 170 has finished passing the message to processor 110, MLSC FPGA 160 clears the bit indicating the buffer is full.

ML2L3I FPGA 170 provides access to the messaging and control functions of MTP-2. The messaging function provides the capability to move messages to and from memory 114 without intervention of processor 110, through a Level 2/Level 3 Interface (L2L3I) 171. These messages are stored locally in MRAM 192. Through a PCI interface 179, processor 110 has access to various control and status functions on the MTP-2signaling link, such as MLSC FPGA 160, HDLC FPGA 150, MRAM 192, CRAM 194, the Matelink, and the physical interface functions, such as LIM 500A. In addition, ML2L3I FPGA 170 can send a global status to Configuration FPGA 180 through PCI interface 179. Matelink Interface 175 provides the communication path to a redundant SLCM, SLCM 100B, for synchronization of various processes. Matelink Interface 175 provides error status indication to SLCM 100B, MTP-2 current state and sequence number synchronization, switchover control, and active/standby interlock. ML2L3I FPGA 170 also includes a Transition Module Interface (TMI) 177. The purpose of TMI 177 is to provide communication between processor 110 and SLTM 200A for control data. In addition, TMI 177 will allow SLCM 100B to pass unsolicited status messages to processor 110, through Configuration FPGA 180.

L2L3I Interface 171 is responsible for transferring signaling messages between memory 114 and MRAM 192 and communicating between processor 110 Level 3 commands and MLSC FPGA 160. L2L3I Interface 171 can act as both a target and an initiator on a CPI bus.

The L3 Control Interface of L2L3I Interface 171 can pass four types of information. To pass this information, L2L3I FPGA 170 uses a parallel output interface to MLSC FPGA 160 that consists of a write enable bit, an eight bit data field, a start command bit, and a parity bit. If a parity error is discovered during a transmission an error signal will be asserted. The L3 Control Interface can pass Level 3 control information generated by processor 110 to MLSC FPGA 160. It can also pass data received through Matelink Interface 175 and global error conditions to MLSC FPGA 160. The data is passed from Matelink Interface 175 as a series of messages, each message containing the link number, the command identifier, the Matelink message type, a two bit number specifying which of the four bytes of Matelink data this message contains, and one byes of Matelink message. Further, it can pass handshake signals from ML2L3I FPGA 170 to MLSC FPGA 160 that indicate the transfer of messages between MRAM 192 and memory 114.

L2L3I 171 also provides Level 2 to Level 3 and Level 3 to Level 2 message handling. In the inbound direction, signaling messages in MRAM 192 need to be communicated to memory 114. When the signaling message is ready for transfer, MLSC FPGA 160 sends a message containing the channel number and buffer indicator on the Level 2 Status Interface. L2L3I 171 then performs this transfer. In the outbound direction, signaling messages are placed in a per channel queue in memory 114. Processor 110 then alerts L2L3I 171 that a signaling message is ready. L2L3I 171 waits to receive a message from MLSC FPGA 160 that an outbound message buffer for the channel is empty. After making the transfer, L2L3I 171 will acknowledge the transfer to MLSC FPGA 160 by generating a message on Level 3 Control Interface with the respective channel number and buffer indicator.

ML2L3I 171 contains a watchdog timer function. The value written to this timer is a maximum number of two and one-half millisecond periods that can occur before the value is rewritten by the processor. A hardware watchdog timer timeout global failure message will be generated any time the internal watchdog timer is not rewritten. If the standby SLCM is not present or is not armed, this error will cause the MLSC FPGA 160 to declare an MTP-2 local processor outage state. If, however, the standby SLCM is present and armed, it will taker over on a plane switchover based on this condition, which is passed over the Matelink to the standby SLCM.

The L2 Status Interface of L2L3I 171 performs three functions. First, its passes L2 state machine and output change status information generated by MLSC FPGA 160 to processor 110. In addition, it receives commands from MLSC FPGA 160 for Matelink Interface 175. MLSC FPGA 160 passes state and sequence information to the standby SLCM in this manner. Level 2 status messages bound for Matelink Interface 175 are received in six data values—the link number and command identifier, the Matelink message type and a two bit field specifying the remaining number of valid bytes, and up to four bytes of data. Finally, it receives handshake signals generated by MLSC FPGA 160 that confirm the reception or transmission of particular messaging buffers in MRAM 192. To pass these commands, L2L3I FPGA 170 uses a parallel interface to MLSC FPGA 160 that consists of a write enable bit, an eight bit data field, a start command bit, and a parity bit. If a parity error or an incorrect start of signal status signal occurs during a transmission, an error signal will be asserted.

TMI 177 can be used to support a variety of signaling link formats. For the current embodiment, the signal to SLTM 200A will be serial. Thus, ML3L2I FPGA 170 will convert PCI accesses into a serial data stream. The serial interface format will be a twelve bit address field, followed by an eight bit data field, a one bit read/write control field, and a one bit parity field. In response to a read or write operation, SLTM 200A will return an eight bit data field, a one bit transaction pass/fail field, and a one bit parity field.

A read or write to SLTM 200A has three possible error conditions—a timeout error, a received parity error, or an operation error at SLTM 200A, indicated by the pass/fail bit being set. After a read or write operation has been undertaken, if ML2L3I FPGA 170 does not receive a response back within six and one-half microseconds, a timeout error flag and new data flag are set in memory, and Configuration FPGA 180 is alerted. If a parity error has occurred in the response message, the parity error flag and the new data flag are set in memory, and Configuration FPGA 180 is alerted. Further, if a read or write was unsuccessful, all ten bits, plus a new data flag, will be stored in memory. Processor 110 can determine whether a write was successful or not by polling the new data flags or responding to an interrupt signal generated by Configuration FPGA 180.

Matelink Interface 175 keeps the state machines of the online and standby SLCM synchronized at MTP-2Level 2 by sending Level 2 state information and sequence numbers from the active SLCM to the standby SLCM. This information is then transferred to the Level 2 interface on the standby SLCM in order to maintain synchronization in the event of a switchover to the standby SLCM. Matelink Interface 175 is also used to monitor the functional sanity of the active SLCM by interpreting hardware and software error messages. In addition, Matelink Interface 175 can be used to check for both an SLCM pull/power failure and a link 95 pull, by sending a signal to the mate SLTM, which returns it using an unpowered and a powered path. The hardware status message contain parity, watchdog timing indicators, and hardware failure indicators, which may be used to make plane switchover decisions. Matelink Interface 175 will also allow switchover to the standby SLCM under host processor software control on the currently active SLCM.

The Matelink interface format is a bit mapped, duplex serial link. The signals in each direction contain a synchronization signal, a clock signal, and a serial data signal.

FIG. 8 illustrates one embodiment of a Matelink message 800. As illustrated, Matelink message 800 includes a one bit parity field, a three bit message type field, an eight bit channel field, and a thirty-two bit message data field. Each Matelink message 800 will be serially shifted onto the Matelink LSB first.

Using Matelink message 800, messages may be sent to the standby SLCM that indicate hardware error status type, software error status type, transmission identification type, which will pass per message transaction identification numbers and their associated MTP-2 FSNs to the standby SLCM for queuing during switchover, and an MTP-2 message type, which passes sufficient state and sequence number information on a per message and per link basis for the standby SLCM to assume active control while maintaining an MTP-2 In-Service or a local processor outage state, if one was present before the switchover. Thus, in one embodiment these messages could contain the channel number, MTP-2 state, forward indicator bit transmitted (FIB) /forward sequence number transmitted (FSN), and backward indicator bit receive (BIB)/backward sequence number received (BSNR). Note that synchronization will only be achieved at MTP-2 Level 2 because signaling messages on the standby SLCM will be lost due to software queue flushing the transmit buffers to avoid duplication of messages on initialization of the standby SLCM. A variety of other message types could also be sent. In addition, other configurations for Matelink message 800 are well known to those skilled in the art.

The physical connections associated with Matelink Interface 175 also include switchover signal, an isolation circuit enable signal, a test active SLCM signal, and two Matelink return signals, which differentiate between a Matelink cable pull and a power failure/card unplug. Additionally, a control plane selection signal is generated by Matelink Interface 175 but terminated on SLTM 200A.

Matelink data transfers will occur at a rate that will guarantee that all data for each channel will be transferred to the standby SLCM for each of the possible signaling channel formats within the time required for the transmission of the minimum size message unit by the active SLCM. In particular embodiments, this rate is 19.44 MHZ.

Moreover, although Matelink Interface 175 will be continuously operational, new per channel state/sequence number data will only be placed on the Matelink after the signaling message begins transmission on the active SLCM.

During periods when no MTP-2 messages are available, Matelink Interface 175 will alternate between sending hardware and software status messages. The hardware status message will consist of the current state of the local active/ standby status plus locally detected hardware errors that could be used to affect a plane switch. The software status message will consist of the state of the transmission Matelink output enable, the arm for plane switchover signal, the enable insolation device signal, the force local card to active signal, and twenty eight bits of software defined error status that could be used to affect a plane switchover.

The purpose of Configuration FPGA 180 for MLSC FPGA 160 is to provide a maskable interrupt for processor 110. A thirty-two bit status register, along with a thirty-two bit interrupt enable register reside in Configuration FPGA 180. Configuration FPGA 180, in turn, manages the interrupt enable registers, reading and clearing of the status register, and generating an interrupt through CPI bridge 142.

Figure 9:
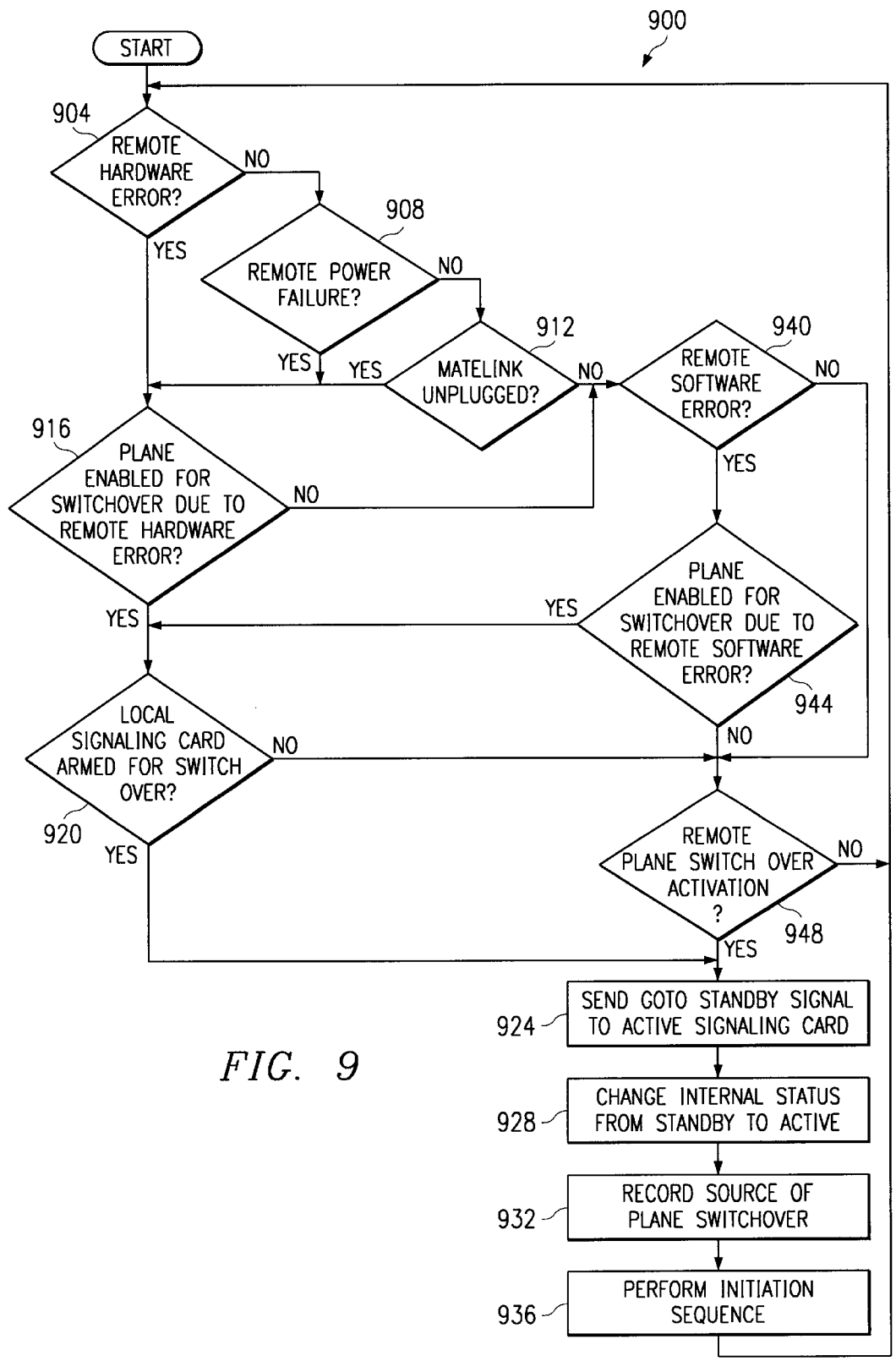
FIG. 9 provides a flowchart that illustrates an embodiment of a method for determining plane switchover.

FIG. 9 shows a flowchart 900 that illustrates one method of performing a plane switchover operation in SLCE 90. The process shown in flowchart 900 is from the perspective of the standby plane in SLCE 90. At decision block 904, the SLCM of the standby plane determines whether a remote hardware error has occurred on the active SLCM. If a hardware error has not occurred on the active SLCM, the standby SLCM then determines whether a power failure has occurred on the active plane at decision block 908. If no power failure is detected on the active plane, standby SLCM then determines whether the mate link has become unplugged at decision block 912. If an affirmative response is received from either decision block 904, decision block 908, or decision block 912, the standby SLCM then determines whether it has been enabled to perform a plane switchover based on a remote hardware error at decision block 916. If the plane switchover based on the remote hardware error has been enabled for the standby SLCM, the standby SLCM then determines whether the local Signaling Card has been armed for switchover at decision block 920. If the local Signaling Card has been armed for switchover, the standby SLCM then sends a goto standby signal to the active Signaling Card at function block 924. After this, the standby SLCM then changes its internal status from standby to active at function block 928. Standby SLCM then records the source of the plane switchover action at function block 932 and performs an initiating sequence at function block 936. After this, standby SLCM will become the active SLCM, and the active SLCM will become the standby SLCM. Thus, flowchart 900 will now be representative of the functions undertaken by the new standby SLCM to monitor for plane switchover.

If, however, the plane switchover was not enabled for a remote hardware error at decision block 916, or if there was not a remote hardware error detected at decision block 904, a remote power failure detected at decision block 908, and the Matelink was not unplugged at decision block 912, standby SLCM determines whether there was a remote software error at decision block 940. If a remote software error is detected at decision block 940, the standby SLCM then determines whether the standby plane is enabled for switchover due to a software error at decision block 944. If the standby plane is so enabled, the standby SLCM determines if the local Signaling Card has been armed for switchover at decision block 920. If the Signaling Card has been armed, the standby SLCM then performs the operations in function blocks 924, 928, 932, and 936, as previously discussed. If, however, the local Signaling Card has not been armed for switchover at decision block 920, the standby SLCM then proceeds to decision block 948. If no remote software error is detected at decision block 940, or if the plane is not enabled for switchover due to a software error at decision block 944, the standby SLCM also proceeds to decision block 948.

At decision block 948, the standby SLCM determines whether a signal has been received for a plane switchover from the active SLCM. If a signal has been received for plane switchover activation from the active SLCM at decision block 948, the standby SLCM then performs the functions in function blocks 924, 928, 932, 936, as previously discussed. However, if the standby SLCM does not detect a remote plane switchover activation at decision block 948, the standby SLCM begins to repeat its monitoring functions.

Although a specific method for determining plane switchover activation is outlined in flowchart 900, a variety of other methods may be used to determine plane switchover activation. For example, a number of the blocks in flowchart 900 may be added, deleted, substituted, or reordered, and still achieve a plane switchover activation method.

Although several embodiments have been described for the present invention, a variety of additions, deletions, substitutions, and alterations may be readily suggested to one skilled in the art. It is intended that the accompanying claims encompass such additions, deletions, substitutions, and alterations.

What is claimed is:

1. A system for managing signaling messages in a telecommunication system, comprising:

a first control module operable to receive signaling messages from a plurality of signaling links, process the signaling messages, and send the processed signaling messages through a communication network interface;

a second control module operable to receive the signaling messages from the plurality of signaling links, process the signaling messages, and send the processed signaling messages through a communication network interface;

a matelink, that is a bi-directional link, coupled to the first control module and the second control module, the matelink operable to communicate the status of the first control module to the second control module and the status of the second control module to the first control module, and thereby to keep the first and second control modules in synchronization; and wherein the first control module and the second control module are further operable to be in either an active mode or a standby mode, only one of the first control module and the second control module being in the active mode at one time, the control module in the active mode sending the processed signaling messages through the associated communication network interface and the status messages over the matelink, said status messages including current state and sequence information from the module in the active mode.

2. The system of claim 1, wherein the status messages indicates that an error has occurred in the first control module.

3. The system of claim 2, wherein the status message indicates that a hardware error has occurred in the first control module.

4. The system of claim 2, wherein the second control module is further operable to determine whether to initiate a switchover between the first control module and the second control module based on the error.

5. The system of claim 4, wherein:

the second control module is further operable to generate a command to initiate a switchover between the first control module and the second control module; and the matelink is further operable to communicate the command to the first control module.

6. The system of claim 1, wherein the first control module is further operable to determine whether to initiate a switchover between the first control module and the second control module based on an error occurring in the first control module.

7. The system of claim 6, wherein:

the first control module is further operable to generate a signal that indicates switchover should occur; and the matelink is further operable to communicate the signal to the second control module.

8. The system of claim 1, further comprising:

a first interface module coupled to the first control module, the first interface module operable to receive the signaling messages from the plurality of signaling links and to send them to the first control module; and a second interface module coupled to the second control module, the second interface module operable to receive the signaling messages from the plurality of signaling links and to send them to the second control module.

9. The system of claim 8, wherein:

the first interface module is further coupled to a second plurality of signaling links and is further operable to receive signaling messages from the first control module and to send the signaling messages over the second signaling links; and the second interface module is further coupled to the second plurality of signaling links and is further operable to receive the signaling messages from the second control messages and to send the signaling messages over the second signaling links;

only one of the first interface module and the second interface module sending the signaling messages over the second signaling links at one time.

10. The system of claim 9, wherein the first control module is further operable to command the first interface module to stop sending signaling messages over the second signaling links.

11. The system of claim 9, wherein the second control module is further operable to command the first interface module to stop sending signaling messages over the second signaling links.

12. The system of claim 1, wherein the signaling messages are Signaling System Number 7 (SS7) signaling messages.

13. The system of claim 1, wherein the first control module and the second control module perform Message Transfer Part (MTP) processing on the signaling messages received from the plurality of signaling links.

14. The system of claim 13, wherein:
the first control module performs MTP Level 2 and Level 3 processing on the signaling messages received from the signaling links when in the active mode and MTP Level 2 processing on the signaling messages in the standby mode; and
the second control module performs MTP Level 2 and Level 3 processing on the signaling messages received from the signaling links when in the active mode and MTP Level 2 processing on the signaling messages in the standby mode;
the matelink communicating MTP Level 2 status signals from the active control module to the standby control module.

15. The system of claim 1, wherein the status message indicates the status of one of the signaling links.

16. The system of claim 15, wherein the matelink can convey the status message to the second control module before the first control module can complete a transmission of an associated signaling message.

17. A method for managing signaling messages in a telecommunication system, comprising:
receiving signaling messages from a plurality of signaling links at a first control module;
processing the signaling messages at the first control module;
sending the processed signaling messages from the first control module through a communication network interface;
receiving the signaling messages from the plurality of signaling links at a second control module;
processing the signaling messages at the second control module; and
sending status messages including current state and sequence information for the first control module to the second control module second control module by a bi-directional matelink, which is operable to keep the first and second control modules in synchronization;
wherein the first control module is in an active mode and the second control module is in a standby mode.

18. The method of claim 17, wherein the status message indicates that an error has occurred on the first control module.

19. The method of claim 18, wherein the status message indicates that a hardware error has occurred in the first control module.

20. The method of claim 18, further comprising determining at the second control module whether to switch the modes of the first control module and the second control module based on the status message indicating an error has occurred.

21. The method of claim 20, further comprising;
generating a signal at the second control module to switch the mode of the first control module; and
communicating the signal to the first control module.

22. The method of claim 17, further comprising determining at the first control module whether to initiate a switch in the mode of the first control module and the second control module based on an error occurring in the first control module.

23. The method of claim 22, further comprising:
generating a signal at the first control module that indicates a mode switch should occur, and
communicating the signal to the second control module.

24. The method of claim 17, further comprising:
receiving the signaling messages from the plurality of signaling links at a first interface module;
sending the signaling messages to the first control module;
receiving the signaling messages from the plurality of signaling links at a second interface module; and
sending the signaling messages to the second control module.

25. The method of claim 24, further comprising:
receiving signaling messages from the first control module at the first interface module;
sending the signaling messages over a plurality of second signaling links;
receiving the signaling messages from the second control messages at the second interface module.

26. The method of claim 25, further comprising commanding the first interface module to stop sending signaling messages over the second signaling links.

27. The method of claim 26, the command is generated by the second control module.

28. The method of claim 17, wherein the signaling messages are Signaling System Number 7 (SS7) signaling messages.

29. The method of claim 17, further comprising performing Message Transfer Part (MTP) processing at the first control module and the second control module on the signaling messages received from the plurality of signaling links.

30. The method of claim 29, further comprising:
performing MTP Level 2 and Level 3 processing at the first control module on the signaling messages received from the signaling links; and
performing MTP Level 2 processing at the second control module on the signaling messages received from the signaling links;
communicating MTP Level 2 status signals from the first control module to the second control module.

31. The method of claim 17, wherein the status message indicates the status of a signal link.

32. The method of claim 31, further comprising conveying the status message to the second control module before the first control module can complete transmission of an associated signaling message.

33. The method of claim 26, further comprising preventing control signals from reaching a plurality of drivers coupled to the signaling messages, to discontinue sending signaling messages from the first control module over the plurality of second signaling links.

* * * * *